United States Patent
Tsutsui et al.

(10) Patent No.: US 10,302,334 B2
(45) Date of Patent: May 28, 2019

(54) SUNLIGHT-TO-HEAT CONVERTING MEMBER, SUNLIGHT-TO-HEAT CONVERTING STACK, SUNLIGHT-TO-HEAT CONVERTING DEVICE, AND SOLAR POWER GENERATING DEVICE

(71) Applicants: KABUSHIKI KAISHA TOYOTA JIDOSHOKKI, Kariya-shi, Aichi (JP); JAPAN FINE CERAMICS CENTER, Nagoya-shi, Aichi (JP)

(72) Inventors: Takuhito Tsutsui, Aichi (JP); Kazuto Noritake, Aichi (JP); Toru Sasatani, Aichi (JP); Norihito Takeuchi, Aichi (JP); Takayuki Homma, Aichi (JP); Yoshiki Okuhara, Aichi (JP)

(73) Assignees: KABUSHIKI KAISHA TOYOTA JIDOSHOKKI, Kariya-shi, Aichi (JP); JAPAN FINE CERAMICS CENTER, Nagoya-shi, Aichi (JP)

( * ) Notice: Subject to any disclaimer, the term of this patent is extended or adjusted under 35 U.S.C. 154(b) by 579 days.

(21) Appl. No.: 14/889,474

(22) PCT Filed: Mar. 19, 2014

(86) PCT No.: PCT/JP2014/057582
§ 371 (c)(1),
(2) Date: Nov. 6, 2015

(87) PCT Pub. No.: WO2014/181586
PCT Pub. Date: Nov. 13, 2014

(65) Prior Publication Data
US 2016/0084532 A1   Mar. 24, 2016

(30) Foreign Application Priority Data

May 7, 2013   (JP) .................................. 2013-097676
Sep. 6, 2013   (JP) .................................. 2013-185183

(51) Int. Cl.
*F24S 70/10*   (2018.01)
*F24S 70/12*   (2018.01)
(Continued)

(52) U.S. Cl.
CPC ............... *F24S 70/20* (2018.05); *F24S 70/10* (2018.05); *F24S 70/12* (2018.05); *F24S 70/30* (2018.05); *Y02E 10/40* (2013.01)

(58) Field of Classification Search
CPC .... F24J 2/485; F24J 2/4652; F24J 2/48; F24J 2/481; Y02E 10/40
See application file for complete search history.

(56) References Cited

U.S. PATENT DOCUMENTS 8,893,711 B2 * 11/2014 Kennedy .................. F24J 2/055
                                                         126/651
9,267,207 B2 *  2/2016 Kruger ..................... C23C 24/04
(Continued)

FOREIGN PATENT DOCUMENTS

CN    101354191 A    1/2009
CN    101737982 A    6/2010
(Continued)

OTHER PUBLICATIONS

Communication dated Nov. 25, 2016, from the European Patent Office in counterpart European application No. 14794235.3.
(Continued)

*Primary Examiner* — David J Laux
(74) *Attorney, Agent, or Firm* — Sughrue Mion, PLLC

(57) ABSTRACT

This invention is a sunlight-to-heat converting member containing chromium silicide having an element ratio of Cr to Si from 1:1.6 to 1:4.7. This invention is also a sunlight-to-heat converting stack including a layer of the sunlight-to-heat converting member and a metal layer. This invention is also a sunlight-to-heat converting device including a light (Continued)

collecting part, either or both of a container and a flow path where sunlight is collected by the light collecting part, and a heating medium housed in either or both of the container and the flow path. The sunlight-to-heat converting member or the sunlight-to-heat converting stack is formed on a surface of either or both of the container and the flow path. The sunlight-to-heat converting member, the sunlight-to-heat converting stack, and the sunlight-to-heat converting device of this invention can convert light to heat efficiently.

10 Claims, 4 Drawing Sheets

(51) Int. Cl.
*F24S 70/20* (2018.01)
*F24S 70/30* (2018.01)

(56) References Cited

U.S. PATENT DOCUMENTS

| | | | |
|---|---|---|---|
| 2006/0219293 A1 | 10/2006 | Morroka et al. | |
| 2008/0210219 A1* | 9/2008 | Bostrom | F24J 2/487 126/569 |
| 2010/0313875 A1 | 12/2010 | Kennedy | |
| 2011/0088687 A1* | 4/2011 | Kuckelkorn | F24J 2/07 126/677 |
| 2011/0303548 A1 | 12/2011 | Demuth et al. | |
| 2012/0180783 A1 | 7/2012 | Krüger et al. | |

FOREIGN PATENT DOCUMENTS

| | | |
|---|---|---|
| JP | 2006-278878 A | 10/2006 |
| JP | 2012-505962 A | 3/2012 |
| WO | 02/103257 A1 | 12/2002 |
| WO | 2011135152 A1 | 11/2011 |
| WO | 2012172148 A1 | 12/2012 |

OTHER PUBLICATIONS

Communication dated Nov. 3, 2016, from the State Intellectual Property Office of the P.R.C. in counterpart Chinese application No. 201480025449.1.
International Search Report of PCT/JP2014/057582, dated Jun. 17, 2014. [PCT/ISA/210].
Communication dated Mar. 27, 2018, from European Patent Office in Application No. 14 794 235.3.

\* cited by examiner

SUNLIGHT-TO-HEAT CONVERTING MEMBER, SUNLIGHT-TO-HEAT CONVERTING STACK, SUNLIGHT-TO-HEAT CONVERTING DEVICE, AND SOLAR POWER GENERATING DEVICE

CROSS REFERENCE TO RELATED APPLICATIONS

This application is a National Stage of International Application No. PCT/JP2014/057582 filed Mar. 19, 2014, claiming priority based on Japanese Patent Application Nos. 2013-097676, filed May 7, 2013, and 2013-185183, filed Sep. 6, 2013, the contents of all of which are incorporated herein by reference in their entirety.

TECHNICAL FIELD

This invention relates to a sunlight-to-heat converting member, a sunlight-to-heat converting stack, a sunlight-to-heat converting device, and a solar power generating device.

BACKGROUND ART

A solar power generating device that converts sunlight to heat and generates power using the resultant heat has been known. In this device, sunlight is collected by a light collecting part. A heating medium (such as oil, dissolved salt, or dissolved sodium) in either or both of a container and a flow path is heated with the collected sunlight. Then, a power generator uses the heat energy of the heated heating medium to generate power. Thus, in terms of enhancing efficiency in converting sunlight to heat (that leads to enhancement of power generation efficiency), forming a member such as a member converting sunlight to heat (hereinafter called a sunlight-to-heat converting member) on a surface of either or both of the container and the flow path and facilitating heating of the heating medium with sunlight collected by the sunlight-to-heat converting member has been examined.

For example, patent document 1 suggests using a cermet layer as the sunlight-to-heat converting member. The cermet mentioned herein is a material combining ceramic and metal.

Patent document 2 suggests using a sheet material as the sunlight-to-heat converting member provided with selective coating on one side and radioactive coating on the opposite side.

REFERENCE

Patent Documents

Patent Document 1: EP 1397622 A
Patent Document 2: JP S57-55363 A

DISCLOSURE OF THE INVENTION

Problems to be Solved by the Invention

However, even the aforementioned conventional sunlight-to-heat converting members are not able to achieve sufficient efficiency in converting sunlight to heat. Thus, facilitating heating of a heating medium with collected sunlight and converting the sunlight to heat more efficiently has strongly been desired.

This invention has been made to solve the aforementioned problem. It is an object of this invention to provide a sunlight-to-heat converting member, a sunlight-to-heat converting stack, and a sunlight-to-heat converting device that can convert sunlight to heat efficiently.

It is also an object of this invention to provide a solar power generating device of high power generation efficiency.

Means for Solving the Problems

As a result of an earnest study made by the present inventors with the intention of solving the aforementioned problem, the present inventors have found that chromium silicide having an element ratio of Cr to Si falling within a given range exhibits characteristics suitable for use in a sunlight-to-heat converting member, thereby completing this invention.

This invention is summarized in the following articles (1) to (9).

(1) A sunlight-to-heat converting member containing chromium silicide having an element ratio of Cr to Si from 1:1.6 to 1:4.7.

(2) The sunlight-to-heat converting member according to article (1), wherein the chromium silicide contains $CrSi_2$ as a major ingredient.

(3) The sunlight-to-heat converting member according to article (1) or (2), wherein the sunlight-to-heat converting member has a film shape of a thickness from 1 nm to 10 μm.

(4) The sunlight-to-heat converting member according to any one of articles (1) to (3), further containing a transparent dielectric substance.

(5) A sunlight-to-heat converting stack including a layer of the sunlight-to-heat converting member according to any one of articles (1) to (4) and a metal layer.

(6) The sunlight-to-heat converting stack according to article (5), wherein a transparent dielectric layer is formed on the layer of the sunlight-to-heat converting member.

(7) The sunlight-to-heat converting stack according to article (6), wherein a transparent dielectric layer is formed between the metal layer and the layer of the sunlight-to-heat converting member.

(8) A sunlight-to-heat converting device including a light collecting part, either or both of a container and a flow path where sunlight is collected by the light collecting part, and a heating medium housed in either or both of the container and the flow path, wherein the sunlight-to-heat converting member according to any one of articles (1) to (4) or the sunlight-to-heat converting stack according to any one of articles (5) to (7) is formed on a surface of either or both of the container and the flow path.

(9) A solar power generating device including the sunlight-to-heat converting device according to article (8) and a power generator, wherein the heating medium in either or both of the container and the flow path is heated by the sunlight-to-heat converting device, and the heat energy of the heated heating medium is utilized in the power generator to generate power.

Effects of the Invention

This invention is capable of providing a sunlight-to-heat converting member, a sunlight-to-heat converting stack, and a sunlight-to-heat converting device that can convert light to heat efficiently.

BEST MODE FOR CARRYING OUT THE INVENTION

First Embodiment

A sunlight-to-heat converting member of this invention contains chromium silicide having an element ratio of Cr to Si from 1:1.6 to 1:4.7. Using chromium silicide having an element ratio of Cr to Si in this range makes it possible to control wavelengths at a changing point between absorption and non-absorption of light while maintaining a steep slope of absorptivity at the changing point.

It is preferable that chromium silicide contain $CrSi_2$ as a major ingredient that is one of various types of chromium silicide (including CrSi, $Cr_5Si_3$, $Cr_3Si$, $CrSi_2$, for example). The "major ingredient" mentioned in this specification is an ingredient of the highest content in a composition containing various ingredients. The optical characteristics of $CrSi_2$ are such that $CrSi_2$ has high absorptivity to visible light of a wavelength of some hundreds of nanometers and has low absorptivity to infrared light of a wavelength of some thousands of nanometers.

Figure 1:
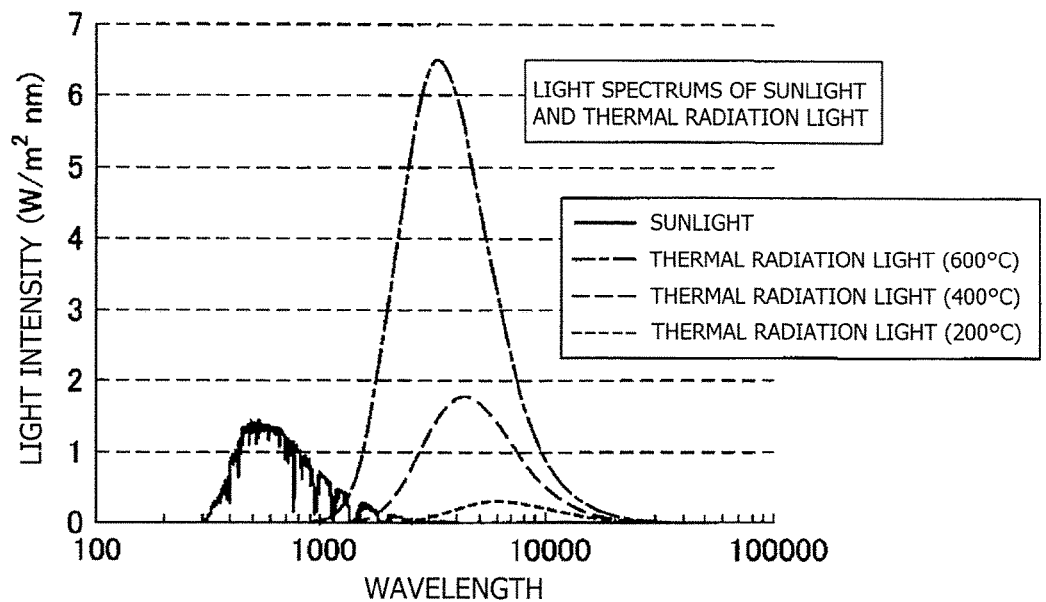
FIG. 1 is a graph showing the light spectrum of sunlight and the light spectrum of thermal radiation light.

FIG. 1 shows the light spectrum of sunlight and the light spectrum of thermal radiation light. As shown in FIG. 1, the light spectrum of sunlight expands with respect to a visible light range of a wavelength of some hundreds of nanometers as a center. In contrast, the light spectrum of thermal radiation light in a temperature of several hundreds of degrees C. (from 200 to 600° C., for example), to which the sunlight-to-heat converting member is to be exposed, expands with respect to an infrared range of a wavelength of some thousands of nanometers as a center.

Generally, the radiation factor of thermal radiation corresponds to absorptivity to thermal radiation light. To reduce heat dissipation to be caused by thermal radiation, the absorptivity to the thermal radiation light should be reduced.

Thus, to obtain a sunlight-to-heat converting member having high absorptivity to sunlight while reducing heat dissipation to be caused by thermal radiation, absorptivity to visible light of a wavelength of several hundreds of nanometers should be increased while absorptivity to infrared light of a wavelength of several thousands of nanometers should be reduced.

In this regard, the sunlight-to-heat converting member of this invention selectively contains chromium silicide ($CrSi_2$) having the aforementioned optical characteristics. This allows absorption of sunlight expanding with respect to a visible light range of wavelengths of some hundreds of nanometers as a center, while making it hard to absorb thermal radiation light that expands with respect to an infrared range of a wavelength of some thousands of nanometers as a center.

The sunlight-to-heat converting member of this invention exhibits a steep change between absorption and non-absorption of light in a wavelength range from 1000 to 2480 nm. This allows efficient absorption of sunlight while suppressing heat dissipation to be caused by thermal radiation from a heating medium. As a result, sunlight can be converted to heat efficiently. If absorptivity to light slopes gently in this wavelength range so no steep change occurs between absorption and non-absorption of light, absorptivity to sunlight is reduced and a thermal radiation factor is increased, leading to increase in loss of heat energy.

The sunlight-to-heat converting member may contain only chromium silicide. Alternatively, the sunlight-to-heat converting member may further contain a material other than chromium silicide. Specifically, the sunlight-to-heat converting member may be made only of chromium silicide or a combined material (composite material) of chromium silicide and a material other than chromium silicide.

A transparent dielectric substance may be used as the material other than chromium silicide used in the combined material. Producing the combined material of chromium silicide and the transparent dielectric substance allows control of the characteristics of the sunlight-to-heat converting member such as refractive index. A material to be used as the transparent dielectric substance is not particularly limited but it may be a material publicly known in a pertinent technical field. Examples of the transparent dielectric substance include $SiO_2$, $Al_2O_3$, and AlN, of which $SiO_2$ is preferable in terms of reducing reflection of light. Like chromium silicide as a simple substance, an exemplary combined material of chromium silicide and $SiO_2$ exhibits a steep slope at the changing point of absorptivity to light. Thus, this combined material has high absorptivity to sunlight and reduces heat dissipation to be caused by thermal radiation.

If the combined material is to be used, the content of chromium silicide in the combined material is not particularly limited. This content may be 10 vol. % or more, 20 vol. % or more, 30 vol. % or more, 40 vol. % or more, 50 vol. % or more, 60 vol. % or more, 70 vol. % or more, 80 vol. % or more, 90 vol. % or more, or 95 vol. % or more, for example.

The shape of the sunlight-to-heat converting member is not particularly limited and any shape may be used. Examples of the shapes include film shapes, tubular shapes, and sheet shapes, of which film shapes are particularly preferable.

If the sunlight-to-heat converting member is to be used in a film shape, the thickness of the film is not particularly limited if it is within a range in which the effect of this invention can be achieved that may preferably be from 1 nm to 10 μm, more preferably, from 5 nm to 100 nm.

A method of manufacturing the sunlight-to-heat converting member is not particularly limited and it may be a method publicly known in a pertinent technical field. As an example, physical vapor deposition (PVD), particularly sputtering, can be used to manufacture the sunlight-to-heat converting member.

Second Embodiment

A sunlight-to-heat converting stack of this invention has a layer of the aforementioned sunlight-to-heat converting member and a metal layer. A transparent dielectric layer is formed on the layer of the sunlight-to-heat converting member. Further, the transparent dielectric layer may be formed between the metal layer and the layer of the sunlight-to-heat converting member.

The sunlight-to-heat converting stack of this embodiment is described below in detail by referring to the drawings.

Figure 2:
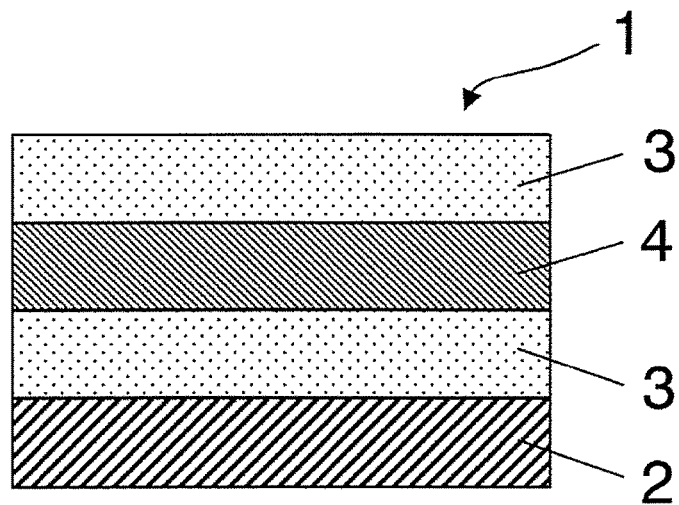
FIG. 2 is a sectional view of a sunlight-to-heat converting stack of a second embodiment.

FIG. 2 is a sectional view of the sunlight-to-heat converting stack of this embodiment. Referring to FIG. 2, a sunlight-to-heat converting stack 1 has a metal layer 2, a transparent dielectric layer 3 formed on the metal layer 2, and a layer 4 of the aforementioned sunlight-to-heat converting member formed on the transparent dielectric layer 3. The transparent dielectric layer 3 is further formed on the layer 4 of the sunlight-to-heat converting member.

The sunlight-to-heat converting stack 1 of the aforementioned structure has the layer 4 of the sunlight-to-heat converting member that exhibits a steep change between absorption and non-absorption of light in a wavelength range from 1000 to 2480 nm and can absorb sunlight efficiently while suppressing heat dissipation caused by thermal radiation from a heating medium. Thus, sunlight can be converted to heat efficiently.

The metal layer 2 is an infrared reflection layer that reflects thermal radiation light. The metal layer 2 is not particularly limited and may be a layer publicly known in a pertinent technical field. Examples of the metal layer 2 include molybdenum (Mo) layers, tungsten (W) layers, silver (Ag) layers, gold (Au) layers, and copper (Cu) layers, of which molybdenum (Mo) layers are preferable in terms of assisting in absorption of sunlight while reflecting thermal radiation.

The thickness of the metal layer 2 is not particularly limited if it is within a range in which the effect of this invention can be achieved that may preferably be from 10 to 500 nm.

The transparent dielectric layer 3 formed on the metal layer 2 is a layer intended to expand the wavelength range in which light is absorbed using the effect of interference. The transparent dielectric layer 3 is not particularly limited and may be a layer publicly known in a pertinent technical field. Examples of the transparent dielectric layer 3 include $SiO_2$ layers, $Al_2O_3$ layers, AlN layers, and $Cr_2O_3$ layers.

The thickness of the transparent dielectric layer 3 formed on the metal layer 2 is not particularly limited if it is within a range in which the effect of this invention can be achieved that may preferably be from 1 to 500 nm.

The layer 4 of the sunlight-to-heat converting member formed on the transparent dielectric layer 3 is a sunlight absorbing layer that can absorb sunlight efficiently while suppressing heat dissipation to be caused by thermal radiation from a heating medium (specifically, without absorbing thermal radiation light), as described above.

The thickness of the layer 4 of the sunlight-to-heat converting member is not particularly limited if it is within a range in which the effect of this invention can be achieved that may preferably be from 5 to 100 nm.

The layer 4 of the sunlight-to-heat converting member may be formed as a single layer or as multiple layers including the layers 4 of sunlight-to-heat converting members of different types.

Any transparent dielectric layer 3 formed on the layer 4 of the sunlight-to-heat converting member is an antireflection layer for sunlight. This transparent dielectric layer 3 may be the same as the transparent dielectric layer 3 formed on the metal layer 2.

Although the thickness of the transparent dielectric layer 3 formed on the layer 4 of the sunlight-to-heat converting member is not particularly limited if it is within a range in which the effect of this invention can be achieved, it is preferably from 10 to 500 nm.

Third Embodiment

A sunlight-to-heat converting device of this invention includes a light collecting part, either or both of a container and a flow path where sunlight is collected by the light collecting part, and a heating medium housed in either or both of the container and the flow path. The aforementioned sunlight-to-heat converting member or the aforementioned sunlight-to-heat converting stack is formed on a surface of either or both of the container and the flow path.

In the sunlight-to-heat converting device of the aforementioned structure, sunlight is collected in either or both of the container and the flow path by the light collecting part and the heating medium in either or both of the container and the flow path is heated with the collected sunlight. The sunlight-to-heat converting member or the sunlight-to-heat converting stack that can absorb sunlight efficiently while suppressing heat dissipation to be caused by thermal radiation from either or both of the container and the flow path housing the heated heating medium is formed on a surface of either or both of the container and the flow path. Thus, sunlight can be converted to heat efficiently.

The sunlight-to-heat converting device of this invention can be used for heating the heating medium to a temperature from 300 to 1100° C., preferably from 400 to 1000° C., more preferably from 400 to 900° C.

The light collecting part used in the sunlight-to-heat converting device of this invention is not particularly limited and may be a light collecting part publicly known in a pertinent technical field. Examples of a usable light collecting part include light collecting parts of parabolic dish types, solar tower types, parabolic trough types, Fresnel types, and linear Fresnel types.

Either or both of the container and the flow path used in the sunlight-to-heat converting device of this invention are not particularly limited as long as either or both of the container and the flow path can accommodate the heating medium. Examples of either or both of the container and the flow path include a pipe.

Fourth Embodiment

A solar power generating device of this invention has the aforementioned sunlight-to-heat converting device and a power generator. The solar power generating device makes the sunlight-to-heat converting device heat the heating medium in either or both of the container and the flow path and generates power by making the power generator use the heat energy of the heated heating medium.

The solar power generating device of the aforementioned structure has a sunlight-to-heat converting device that can convert sunlight to heat efficiently. Thus, the solar power generating device to be provided achieves high power generation efficiency.

The power generator used in the solar power generating device of this invention is not particularly limited as long as it can convert heat to electricity. Examples of the power generator include a power generator that can generate power by making an evaporating medium such as water or ammonia evaporate using the heated heating medium, to rotate a steam turbine with steam resulting from the evaporation.

EXAMPLES

The following describes this invention in detail by referring to Examples and a Comparative Example. However, this invention is not limited to these Examples.

The characteristics of a sunlight-to-heat converting stack were obtained through multilayer approximation based on an optical constant (n, k). The value of a known optical constant of each layer can be obtained from literature. In a case where the optical constant was unclear, it was obtained by actually producing a single-layer film and measuring or calculating the optical constant (n, k) of each layer required for multilayer approximation.

Example 1

Figure 3:
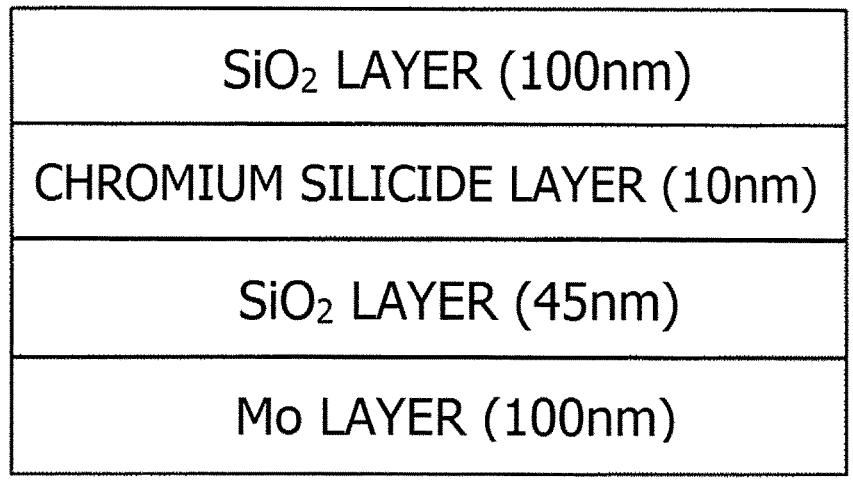
FIG. 3 is a sectional view of a sunlight-to-heat converting stack of Example 1.

The absorption characteristics of a sunlight-to-heat converting stack having a structure shown in FIG. 3 were obtained through multilayer approximation. To produce a single-layer film to be used for measurement of an optical constant, quartz glass (30 mm in length, 20 mm in breadth, and 1 mm in thickness) was used as a substrate. The temperature of the substrate was set at room temperature and various single-layer films were deposited through sputtering. After the deposition, the single-layer films were annealed for an hour at a temperature from 600 to 800° C. in a vacuum furnace. The sputtering was performed in an Ar atmosphere (flow rate of 20 sccm and pressure of 0.4 Pa).

For formation of an $SiO_2$ layer, plasma was generated by using an $SiO_2$ target and a high-frequency current (RF) source with sputtering power of 200 W. For formation of a chromium silicide layer, plasma was generated by using a Cr target, an Si target, and a direct-current (DC) power source. Chromium silicide layers having different element ratios of Cr to Si were produced by changing sputtering power for Cr. A chromium silicide layer having an element ratio of Cr to Si of 1:4.7 was formed by generating plasma with sputtering power of 3 W for Cr and sputtering power of 50 W for Si. A chromium silicide layer having an element ratio of Cr to Si of 1:3.5 was formed by generating plasma with sputtering power of 4 W for Cr and sputtering power of 50 W for Si. A chromium silicide layer having an element ratio of Cr to Si of 1:2.0 was formed by generating plasma with sputtering power of 7 W for Cr and sputtering power of 50 W for Si. A chromium silicide layer having an element ratio of Cr to Si of 1:1.6 was formed by generating plasma with sputtering power of 9 W for Cr and sputtering power of 50 W for Si. A chromium silicide layer having an element ratio of Cr to Si of 1:1.4 was formed by generating plasma with sputtering power of 10 W for Cr and sputtering power of 50 W for Si. A chromium silicide layer having an element ratio of Cr to Si of 1:1.2 was formed by generating plasma with sputtering power of 11 W for Cr and sputtering power of 50 W for Si.

Figure 4:
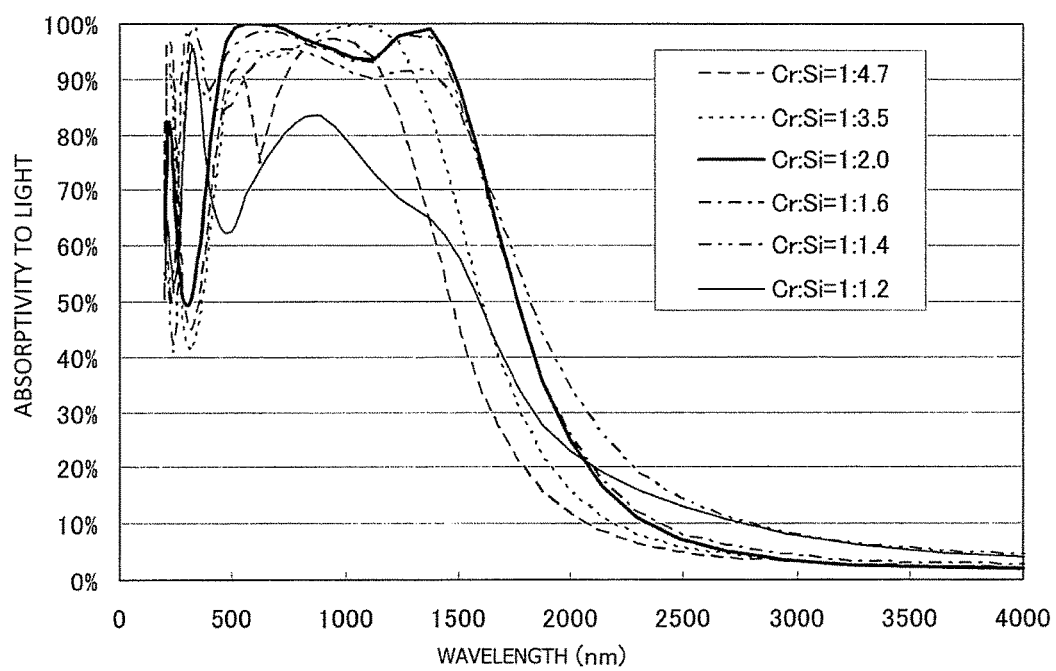
FIG. 4 is a graph showing the absorption characteristics of the sunlight-to-heat converting stack of Example 1.

The absorption characteristics of a sunlight-to-heat converting stack (responsive to a heat collection temperature of 400° C.) were obtained through multilayer approximation based on the optical constant (n, k) of Mo, the optical constant ($n_c$, $k_c$) of $SiO_2$, and the optical constant ($n_s$, $k_s$) of chromium silicide. FIG. 4 shows resultant absorption characteristics.

The optical constant (n, k) of Mo was determined by referring to the publication "Handbook of Optical Constants of Solids, Edward D. Palik, Academic Press, Boston, 1985."

The optical constant ($n_c$, $k_c$) of $SiO_2$ and the optical constant ($n_s$, $k_s$) of chromium silicide were determined using data measured with a spectroscopic ellipsometer and data calculated by using reflectance characteristics and transmittance characteristics measured with a spectrophotometer.

As shown in FIG. 4, a sunlight-to-heat converting stack with a chromium silicide layer having an element ratio of Cr to Si in a range from 1:1.6 to 1:4.7 as the solar heat-to-heat converting member makes the slope of absorptivity to light in a wavelength range from 1000 to 2480 nm steeper than that in a sunlight-to-heat converting stack with the chromium silicide layer having the element ratio of Cr to Si of 1:1.2 as the solar heat-to-heat converting member and a sunlight-to-heat converting stack with the chromium silicide layer having the element ratio of Cr to Si of 1:1.4 as the solar heat-to-heat converting member. Thus, the sunlight-to-heat converting stack with the chromium silicide layer having the element ratio of Cr to Si in the range from 1:1.6 to 1:4.7 was found to be capable of absorbing sunlight efficiently while suppressing heat dissipation to be caused by thermal radiation from a heating medium. In the range from 1:1.6 to 1:4.7 relating to an element ratio of Cr to Si, slopes of absorptivity to light are substantially the same. This shows that a wavelength range in which light is absorbed and a wavelength range in which light is not absorbed can be controlled by controlling an element ratio without the need to change the slope of absorptivity to light, thereby achieving a high degree of design freedom.

Figure 5:
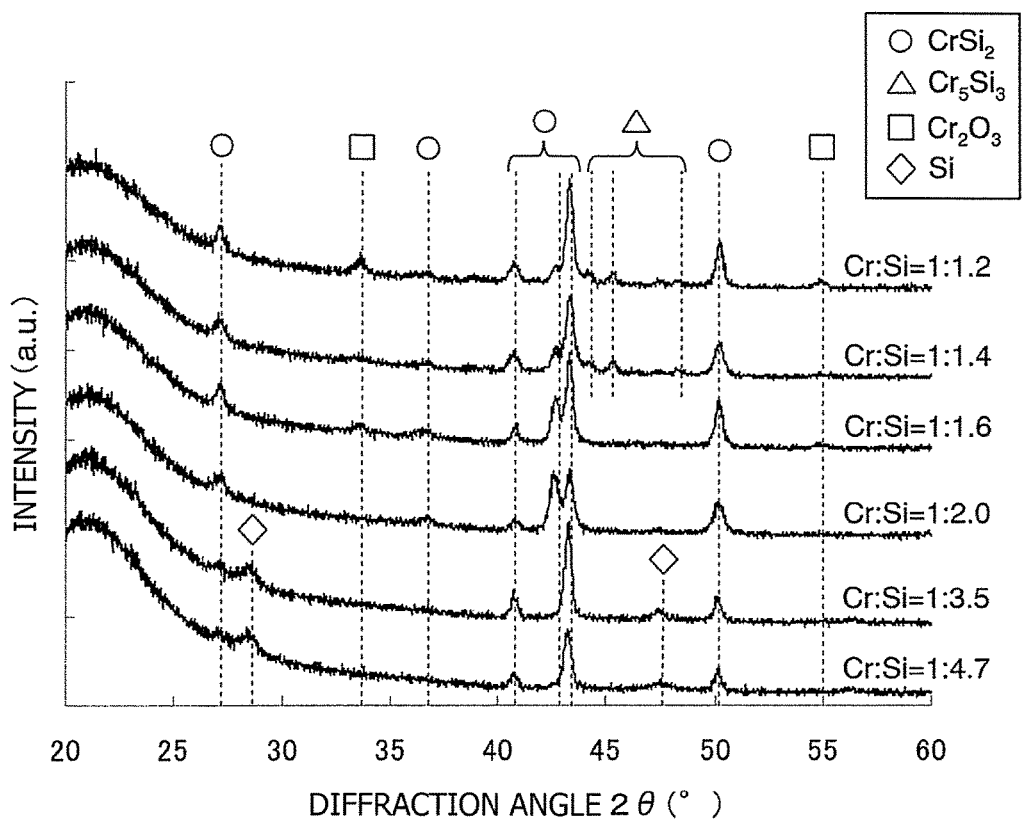
FIG. 5 is a graph showing x-ray diffraction of a chromium silicide layer in the sunlight-to-heat converting stack of Example 1.

Next, to examine the aforementioned experimental results, the chromium silicide layers produced in the aforementioned ways were analyzed through an X-ray diffraction method. FIG. 5 shows the results of the analysis.

As shown in FIG. 5, the diffraction peaks of $CrSi_2$ and Si were observed in the chromium silicide layers having respective element ratios of Cr to Si of 1:3.5 and 1:4.7. In the case of the chromium silicide layer having the element ratio of Cr to Si of 1:2.0, only the diffraction peak of $CrSi_2$ was observed. In the case of the chromium silicide layer having the element ratio of Cr to Si of 1:1.6, a diffraction peak of $CrSi_2$ and that of $Cr_2O_3$ were observed. Examining these results shows that in the case of each chromium silicide layer having the element ratio of Cr to Si in the range from 1:1.6 to 1:4.7, a diffraction peak of $CrSi_2$ was observed and a diffraction peak of chromium silicide (any of CrSi, $Cr_5Si_3$, and $Cr_3Si$) richer in chrome than $CrSi_2$ was not observed. In this case, the chromium silicide layer contains $CrSi_2$ as the greater part of chromium silicide while containing substantially no chromium silicide richer in chrome than $CrSi_2$. That is, containing $CrSi_2$ as a major ingredient is considered to be a factor that makes it possible to obtain the aforementioned characteristics.

In the case of the chromium silicide layers having their respective element ratios of Cr to Si of 1:1.2 and 1:1.4, a diffraction peak of $Cr_5Si_3$ was observed in addition to the diffraction peaks of $CrSi_2$ and $Cr_2O_3$. In this case, chrome-rich chromium silicide (any of CrSi, $Cr_5Si_3$, and $Cr_3Si$) was generated in larger quantities than in the chromium silicide layer having the element ratio of Cr to Si in the range from 1:1.6 to 1:4.7. This is considered to be a cause that makes it impossible to obtain the aforementioned characteristics.

Example 2

Figure 6:
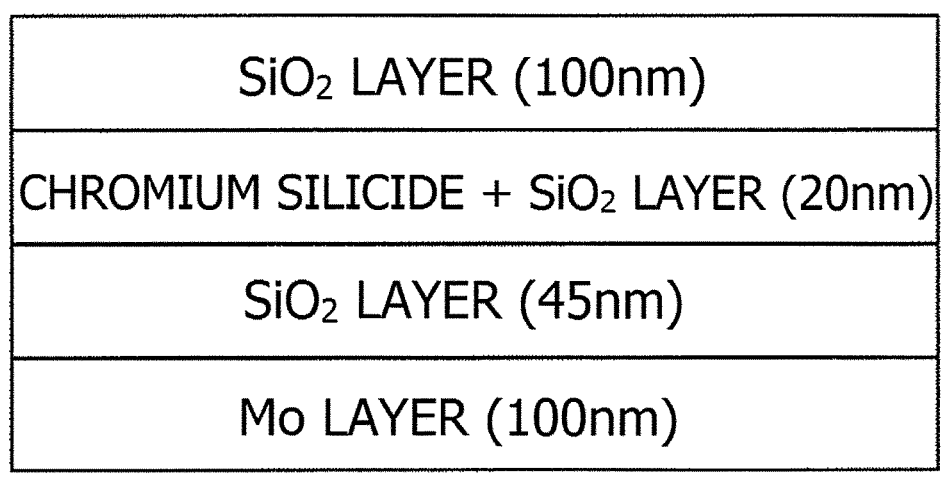
FIG. 6 is a sectional view of a sunlight-to-heat converting stack of Example 2 including a layer made of a combined material of chromium silicide and $SiO_2$.

A sunlight-to-heat converting stack having a structure shown in FIG. 6 was produced. This structure is the same as that of Example 1, except that a layer made of a combined material of chromium silicide and $SiO_2$ (volume percentage of chromium silicide and SiO$_2$ is 50:50) was used instead of the chromium silicide layer. The absorption characteristics of this sunlight-to-heat converting stack were obtained through multilayer approximation. Chromium silicide having an element ratio of Cr to Si of 1:2.0 was used as chromium silicide used in this example.

Targets used for formation of the layer made of the combined material of chromium silicide and SiO$_2$ (including chromium silicide and SiO$_2$ layer) were a Cr target, an Si target, and an SiO$_2$ target. Sputtering power was calculated based on a deposition rate during sputtering so as to obtain a volume percentage of chromium silicide and SiO$_2$ of 50:50. More specifically, plasma was generated from the Cr target and the Si target by using a direct-current (DC) power source with sputtering power of 7 W for Cr and sputtering power of 50 W for Si. Plasma was generated from the SiO$_2$ target by using a high-frequency current (RF) source with sputtering power of 50 W.

Figure 8:
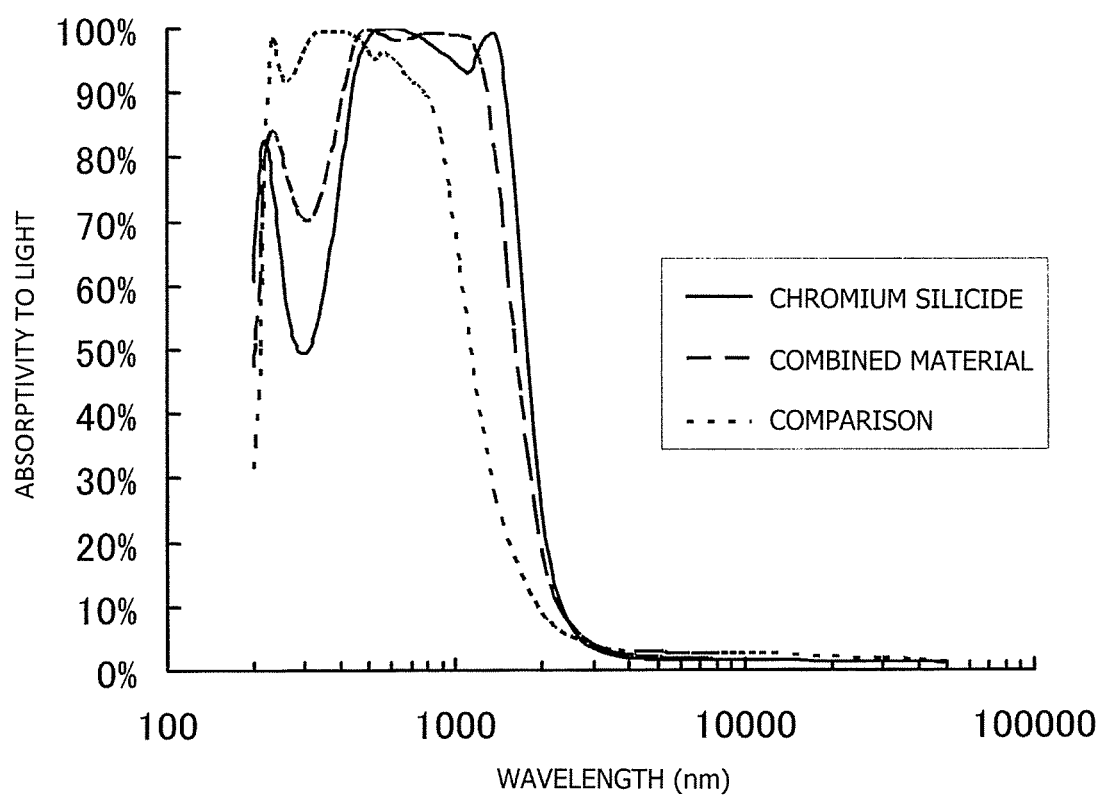
FIG. 8 is a graph showing the absorption characteristics of a sunlight-to-heat converting stack of Example 2.

The absorption characteristics of the sunlight-to-heat converting stack (responsive to a heat collection temperature of 400° C.) were obtained through multilayer approximation based on the optical constant (n, k) of Mo, the optical constant ($n_c$, $k_c$) of SiO$_2$, and the optical constant (n, k) of the combined material of chromium silicide and SiO$_2$. FIG. 8 shows resultant absorption characteristics indicated by "COMBINED MATERIAL".

The optical constant (n, k) of Mo was determined by referring to the publication "Handbook of Optical Constants of Solids, Edward D. Palik, Academic Press, Boston, 1985." The optical constant ($n_c$, $k_c$) of SiO$_2$ and the optical constant (n, k) of the combined material of chromium silicide and SiO$_2$ were determined using data measured with a spectroscopic ellipsometer and data calculated by using reflectance characteristics and transmittance characteristics measured with a spectrophotometer.

Figure 7:
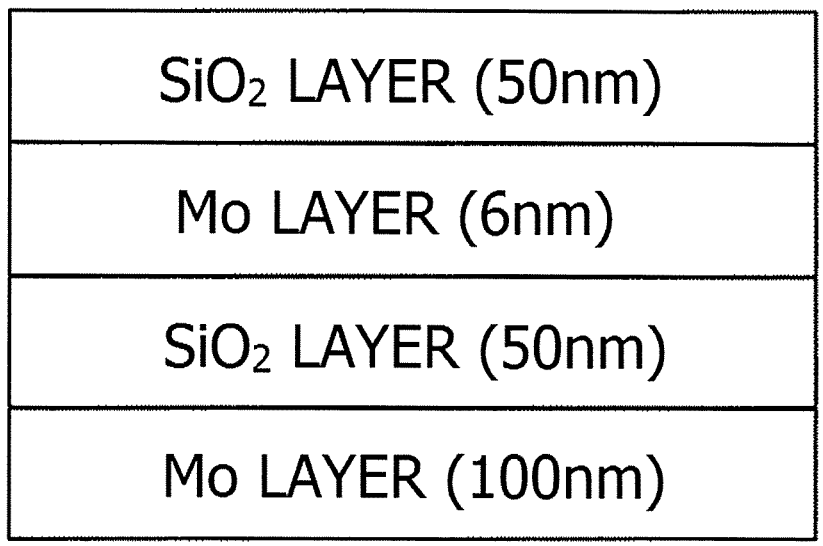
FIG. 7 is a sectional view of a sunlight-to-heat converting stack of Example 2 used for comparison.

For comparison, a sunlight-to-heat converting stack having a structure shown in FIG. 7 was produced. This structure is the same as that of Example 1, except that an Mo layer was used instead of the chromium silicide layer and the thickness of the SiO$_2$ layer was changed. The absorption characteristics of this sunlight-to-heat converting stack were obtained through multilayer approximation.

The absorption characteristics of this sunlight-to-heat converting stack (responsive to a heat collection temperature of 400° C.) were obtained through multilayer approximation based on the optical constant (n, k) of Mo and the optical constant ($n_c$, $k_c$) of SiO$_2$. FIG. 8 shows resultant absorption characteristics indicated by "COMPARISON".

The optical constant (n, k) of Mo was determined by referring to the publication "Handbook of Optical Constants of Solids, Edward D. Palik, Academic Press, Boston, 1985." The optical constant ($n_c$, $k_c$) of SiO$_2$ was determined using data measured with a spectroscopic ellipsometer and data calculated by using reflectance characteristics and transmittance characteristics measured with a spectrophotometer.

For reference, FIG. 8 also shows a result of the absorption characteristics of the sunlight-to-heat converting stack using the chromium silicide layer having the element ratio of Cr to Si of 1:2.0 produced in Example 1. This result is indicated by "CHROMIUM SILICIDE."

As shown in the graph of FIG. 8, the sunlight-to-heat converting stack for comparison having the Mo layer as the solar heat-to-heat converting member produced a gentle slope of absorptivity to light in a wavelength range from 1000 to 2480 nm. In contrast, the sunlight-to-heat converting stack having the chromium silicide layer as the solar heat-to-heat converting member and the sunlight-to-heat converting stack having the layer made of the combined material of chromium silicide and SiO$_2$ as the solar heat-to-heat converting member each produced a steep slope of absorptivity to light in the wavelength range from 1000 to 2480 nm. Thus, the sunlight-to-heat converting stack having the chromium silicide layer as the solar heat-to-heat converting member and the sunlight-to-heat converting stack having the layer made of the combined material of chromium silicide and SiO$_2$ as the solar heat-to-heat converting member were found to be capable of absorbing sunlight efficiently while suppressing heat dissipation to be caused by thermal radiation from a heating medium, compared to the sunlight-to-heat converting stack for comparison having the Mo layer as the solar heat-to-heat converting member.

As understood from the aforementioned results, this invention is capable of providing a sunlight-to-heat converting member, a sunlight-to-heat converting stack, and a sunlight-to-heat converting device that can convert light to heat efficiently. This invention is also capable of providing a solar power generating device of high power generation efficiency through use of the sunlight-to-heat converting member, the sunlight-to-heat converting stack, and the sunlight-to-heat converting device.

This international application claims priority based on Japanese Patent Application No. 2013-097676 filed on May 7, 2013 and Japanese Patent Application No. 2013-185183 filed on Sep. 6, 2013, the disclosure of each of which is incorporated herein by reference in its entirety.

REFERENCE SIGNS LIST

1 Sunlight-to-heat converting stack
2 Metal layer
3 Transparent dielectric layer
4 Layer of sunlight-to-heat converting member

The invention claimed is:

1. A sunlight-to-heat converting device comprising a light collecting part, either or both of a container and a flow path where sunlight is collected by the light collecting part, and a heating medium housed in either or both of the container and the flow path, wherein
   a sunlight-to-heat converting member containing CrSi$_2$ as the major ingredient is formed on a surface of either or both of the container and the flow path.

2. The sunlight-to-heat converting device according to claim 1, wherein the sunlight-to-heat converting member has a film shape of a thickness from 1 nm to 10 µm.

3. The sunlight-to-heat converting device according to claim 1, wherein the sunlight-to-heat converting member further contains a transparent dielectric substance.

4. A solar power generating device, comprising:
   a sunlight-to-heat converting device according to claim 1; and
   a power generator, wherein
   the heating medium in either or both of the container and the flow path is heated by the sunlight-to-heat converting device, and the heat energy of the heated heating medium is utilized in the power generator to generate power.

5. A sunlight-to-heat converting device comprising a light collecting part, either or both of a container and a flow path where sunlight is collected by the light collecting part, and a heating medium housed in either or both of the container and the flow path, wherein
   a sunlight-to-heat converting stack is formed on a surface of either or both of the container and the flow path,
   the sunlight-to-heat converting stack comprises:

a layer of a sunlight-to-heat converting member containing $CrSi_2$ as the major ingredient, and a metal layer.

6. The sunlight-to-heat converting device according to claim 5, further comprising a transparent dielectric layer formed on the layer of the sunlight-to-heat converting member on a side opposite to the metal layer.

7. The sunlight-to-heat converting device according to claim 6, further comprising a second transparent dielectric layer formed between the metal layer and the layer of the sunlight-to-heat converting member.

8. The sunlight-to-heat converting device according to claim 5, wherein the sunlight-to-heat converting member has a film shape of a thickness from 1 nm to 10 μm.

9. The sunlight-to-heat converting device according to claim 5, wherein the sunlight-to-heat converting member further contains a transparent dielectric sub stance.

10. A solar power generating device, comprising a sunlight-to-heat converting device according to claim 5; and a power generator, wherein the heating medium in either or both of the container and the flow path is heated by the sunlight-to-heat converting device, and the heat energy of the heated heating medium is utilized in the power generator to generate power.

\* \* \* \* \*